(12) United States Patent
Isono

(10) Patent No.: US 7,511,899 B2
(45) Date of Patent: Mar. 31, 2009

(54) IMAGE PICKUP OPTICAL SYSTEM AND DIGITAL APPARATUS USING THE SAME

(75) Inventor: Masashi Isono, Hoi-gun (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 588 days.

(21) Appl. No.: 11/234,576

(22) Filed: Sep. 23, 2005

(65) Prior Publication Data
US 2006/0066748 A1 Mar. 30, 2006

(30) Foreign Application Priority Data
Sep. 28, 2004 (JP) ............................. 2004-280847

(51) Int. Cl.
*G02B 9/12* (2006.01)
(52) U.S. Cl. .................. 359/784; 359/716; 359/738
(58) Field of Classification Search ................ 359/716, 359/738–740, 754–757, 763–765, 771, 772, 359/775, 784
See application file for complete search history.

(56) References Cited

U.S. PATENT DOCUMENTS

| | | | | |
|---|---|---|---|---|
| 7,184,225 | B1 * | 2/2007 | Noda | 359/784 |
| 7,307,799 | B2 * | 12/2007 | Minefuji | 359/738 |
| 7,362,518 | B2 * | 4/2008 | Sun | 359/753 |
| 2003/0210341 | A1 | 11/2003 | Isono | 348/335 |

* cited by examiner

*Primary Examiner*—Darryl J Collins
(74) *Attorney, Agent, or Firm*—Sidley Austin LLP

(57) ABSTRACT

An image pickup optical system comprising three lenses for forming an image on a solid imaging element, wherein the comprised lenses are, from an object side, a positive first lens (FL1) whose convex surface is directed toward the object side, an aperture stop (ST), a negative second lens (FL2) and a negative third lens (FL3), and the following conditional expression is fulfilled, $$-0.23 < f/f2 < -0.02$$

provided that:
f: a focal length of the entire system; and
f2: a focal length of the second lens (FL1).

9 Claims, 7 Drawing Sheets

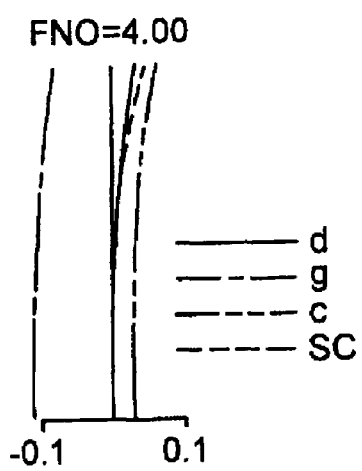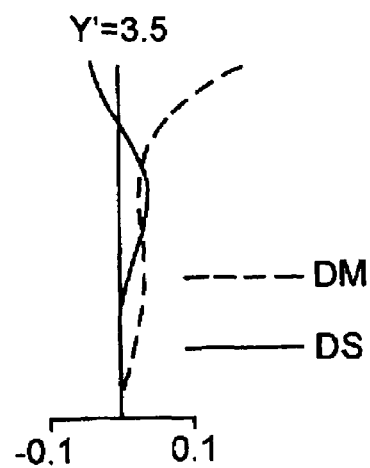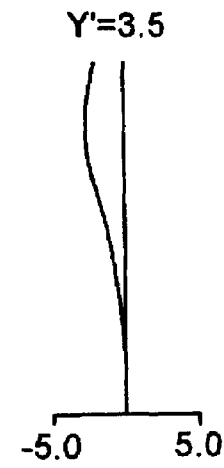
FIG. 6(A) SPHERICAL ABERRATION SINE CONDITION
FIG. 6(B) ASTIGMATISM
FIG. 6(C) DISTORTION %

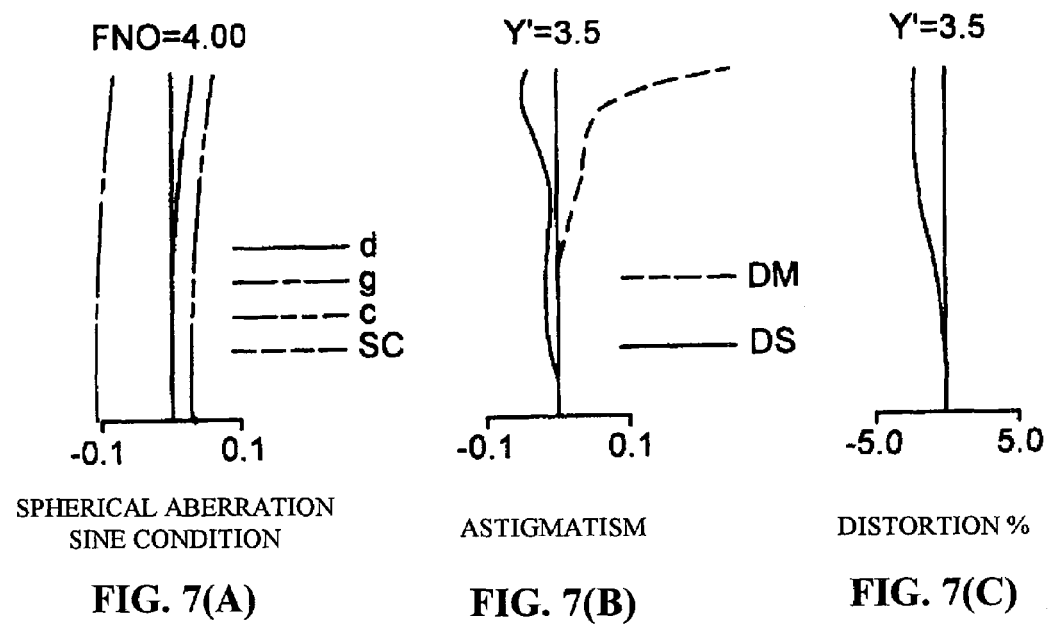
FIG. 7(A) SPHERICAL ABERRATION SINE CONDITION
FIG. 7(B) ASTIGMATISM
FIG. 7(C) DISTORTION %

US 7,511,899 B2

IMAGE PICKUP OPTICAL SYSTEM AND DIGITAL APPARATUS USING THE SAME

The present application claims priority to Japanese Patent Application No. 2004-280847 filed Sep. 28, 2004, the entire content of which is hereby incorporated by reference.

BACKGROUND OF THE INVENTION

1. Field of the Invention

The present invention relates to an image pickup optical system of a small size, more particularly to a compact image pickup optical system exerting a high performance and suitable for digital apparatuses (digital still camera, digital video camera and the like) for fetching a projected image of a photographic subject using a solid imaging element.

2. Description of the Related Art

In recent years, along with the diffusion of a personal computer and the like, a digital still camera, a digital video camera and the like (hereinafter, simply referred to as "digital camera") capable of easily fetching image information into a digital apparatus have been increasingly made available to individual users. It is expected that the digital cameras will be more penetrated in the future as an input device for the image information.

As another trend, a solid imaging element such as CCD (Charge Coupled Device) installed in the digital camera has been increasingly reduced in size, in response to which it becomes necessary for the digital camera to be further downsized. Accordingly, it is strongly demanded that an image pickup optical system occupying a largest area in the digital input device be also downsized. The easiest way of downsizing the image pickup optical system is to downsize the solid imaging element. However, it is necessary to downsize a light receiving element in order to downsize the solid imaging element, which makes it more difficult to manufacture the solid imaging element and requests the image pickup optical system to exert a higher performance.

When the image pickup optical system is downsized with the solid imaging element remaining the same size, an exit-pupil position is inevitably drawn to an image surface. When the exit-pupil position is drawn to the image surface, an off-axis luminous flux emitted from the image pickup optical system obliquely enters the image surface. Therefore, a condensing performance of a micro lens provided in a front surface of the solid imaging lens cannot be sufficiently exerted, which unfavorably generates a significant difference between an image brightness at a central part of the image and an image brightness in a peripheral part of the image. An effort of increasing a distance between the exit-pupil position of image pickup optical system and the solid imaging element in order to solve the foregoing problem unavoidably leads the entire image pickup optical system to grow in size.

As additional points to be remarked, there is a growing demand for the cost reduction of the image pickup optical system due to the competitive price reductions in recent years, and a higher performance is requested in the image pickup optical system because of an increasingly higher density of the solid imaging element in recent years. In order to satisfy the aforementioned recent demands, image pickup optical systems for solid imaging element comprising three lenses were proposed in U.S. Pat. Nos. 6,795,253, 6,804,067, No. 2003/210341, No. 2004/21957, and No. 2005/30645 of the US Patents.

However, any of the image pickup optical systems comprising three lenses, which are recited in the foregoing patent literatures, comprises two positive lenses and a negative lens and accordingly included a disadvantage in downsizing the image pickup optical system.

SUMMARY OF THE INVENTION

Therefore, a main object of the present invention is to provide an image pickup optical system reduced in cost and size.

Another object of the present invention is to provide an image pickup optical system exerting a favorable optical performance for a solid imaging element.

In order to achieve the foregoing and other objects, in an aspect of the present invention, an image pickup optical system for forming an image on a solid image element comprises, from an object side, a first lens having a positive power whose convex surface is directed toward the object side, an aperture stop, a second lens having a negative power and a third lens having a negative power, wherein the following conditional expression (A0) is fulfilled, $$-0.23 < f/f2 < -0.02 \tag{A0}$$

provided that:
f: a focal length of the entire system; and
f2: a focal length of the second lens.

The invention itself, together with further objects and attendant advantages, will be best be understood by reference to the following detailed description taken in conjunction with the accompanying drawings.

BRIEF DESCRIPTION OF THE DRAWINGS

FIGS. 6(A) through 6(C) are aberration charts according to the Example 1.
FIGS. 7(A) through 7(C) are aberration chart according to the Example 2.

In the following description, like pars are designated by like reference numbers throughout the several drawings.

DETAILED DESCRIPTION OF THE PREFERRED EMBODIMENTS

Figure 1:
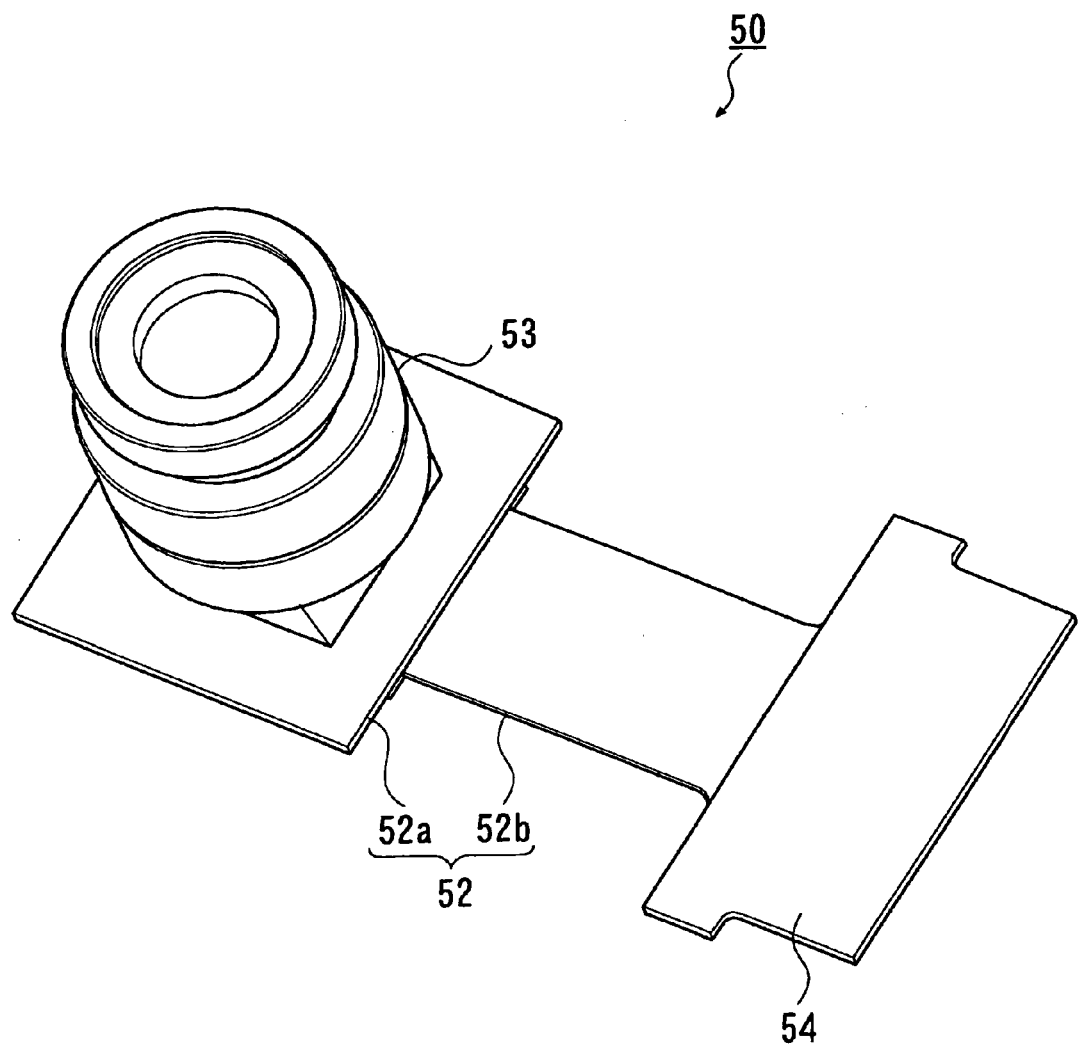
FIG. 1 is a perspective view of an image pickup device.

Hereinafter, preferred embodiments of the present invention are described referring to the drawings. In the description below, "power" represents an amount defined by an inverse number of a focal length.

FIG. 1 is a perspective view of an image pickup device 50 to which the present invention is implemented. The image pickup device 50 comprises a lens unit 53, a solid imaging element as an imaging element (CCD, CMOS or the like/not shown) and a substrate 52 for retaining the lens unit 53 and the solid imaging element, the substrate 52 further having an external connection terminal 54 for transmitting/receiving an electrical signal, which are integrally formed therein.

The substrate 52 comprises a support flat plate 52a for supporting the solid imaging element and the lens unit 53 on a plane thereof and a flexible substrate 52b whose one end is connected to a rear surface of the support flat plate 52a (surface reverse to the solid imaging element).

The flexible substrate 52b, whose one end is connected to the support flat plate 52a as described above, connects the support flat plate 52a and an external circuit (for example, control circuit included in an upper apparatus in which the image pickup device is installed) via the external output terminal 54 provided on another end thereof so that a voltage for driving the solid imaging element and a clock signal is received from the external circuit, a digital YUV signal is outputted to the external circuit, and the like. Further, an intermediate section of the flexible substrate 52b in a longitudinal direction thereof is pliable or deformable, and provides a degree of freedom for the support flat plate 52a for a direction and a position of the external output terminal when the intermediate section is deformed.

The lens unit 53 is fixedly bonded to the plane of the support flat plate 52a of the substrate 52 on which the solid imaging element is provided with the solid imaging element being stored on an inner side of the lens unit 53. An image pickup optical system is stored and retained inside of the lens unit 53.

Figure 2A:
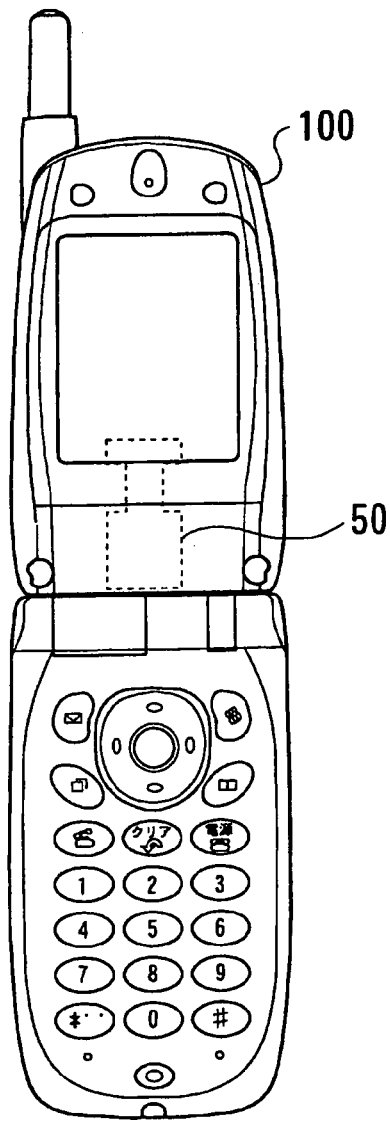
FIG. 2(A) is a front view of a mobile telephone in which the image pickup device is incorporated.
Figure 2B:
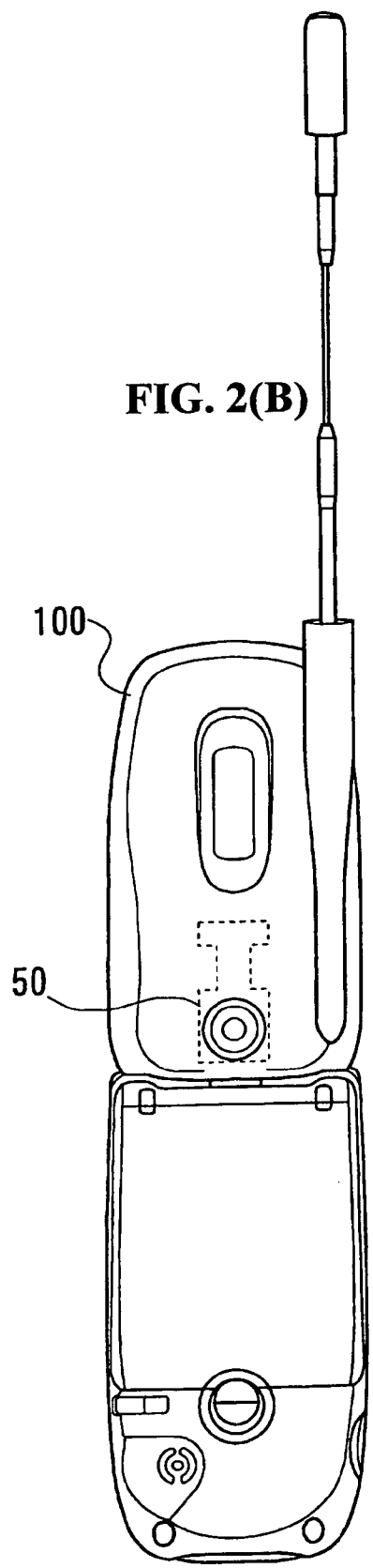
FIG. 2(B) is a rear view of the mobile telephone in which the image pickup device is incorporated.
Figure 3:
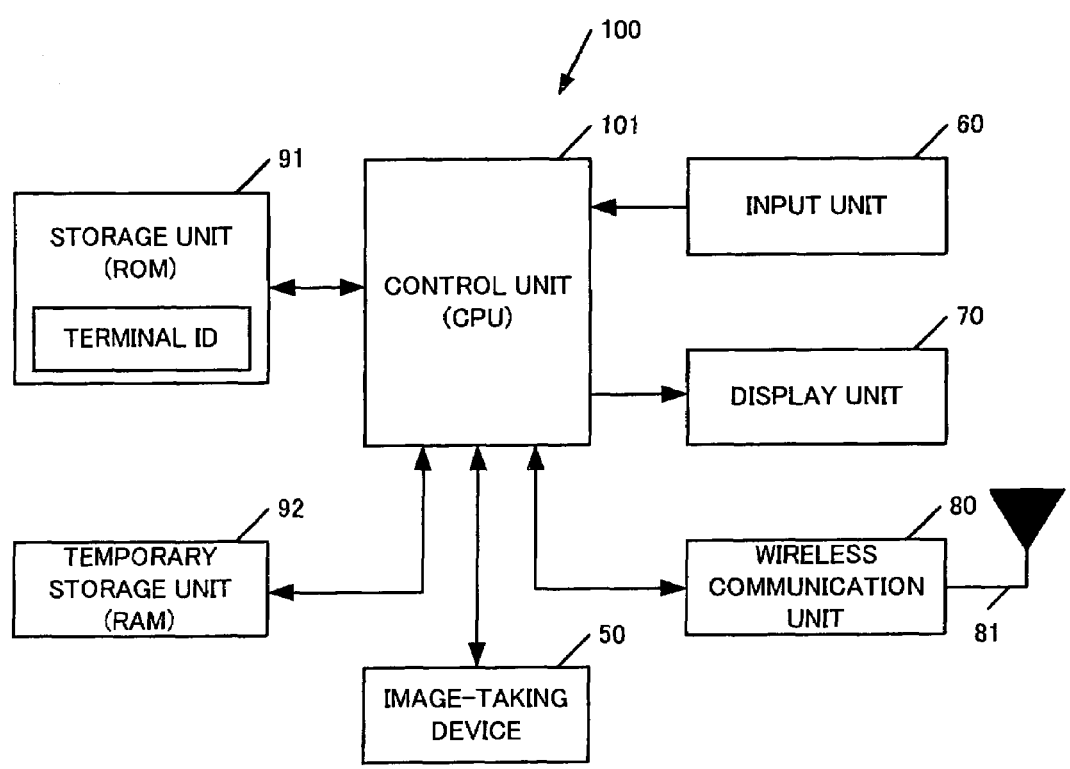
FIG. 3 is a control block diagram of the motile telephone.

Next, a usage mode of the image pickup device 50 is described. FIG. 2 shows a state where the image pickup device 50 is installed in a mobile telephone 100 as a mobile terminal. FIG. 3 is a control block diagram of the mobile telephone 100.

The image pickup device 50 is disposed at a position corresponding to a lower side of a liquid crystal display unit with an object-side end surface of the lens unit 53 in the image pickup optical system being provided, for example, on a rear surface of the mobile telephone 100 (a surface on the liquid-crystal-display-unit side is a front surface).

The external connection terminal 54 of the image pickup device 50 is connected to a control unit 101 of the mobile telephone 100 to thereby output image signals such as a luminance signal and a color-difference signal to the control-unit-101 side.

The mobile telephone 100, as shown in FIG. 3, integrally controls the respective units, and comprises the control unit (CPU) 101 for executing programs in accordance with respective processings, an input unit 60 for instructing/inputting a number and the like via keys, a display unit 70 for displaying an obtained image and the like other than predetermined data, a radio communication unit 80 for communicating different informations relative to an external server, a memory unit (ROM) 91 for memorizing required data such as a system program, respective processing programs, an terminal ID of the mobile telephone 100 and the like, and a temporary memory unit (RAM) 92 for temporarily storing the respective programs executed by the control unit 101, data, processed data and imaging data obtained by the image pickup device 50.

The image signal inputted from the image pickup device 50 is memorized in the memory unit 92, displayed on the display unit 70, and further transmitted outside as image information via the radio communication unit 80 under the control system of the mobile telephone 100.

Figure 4:
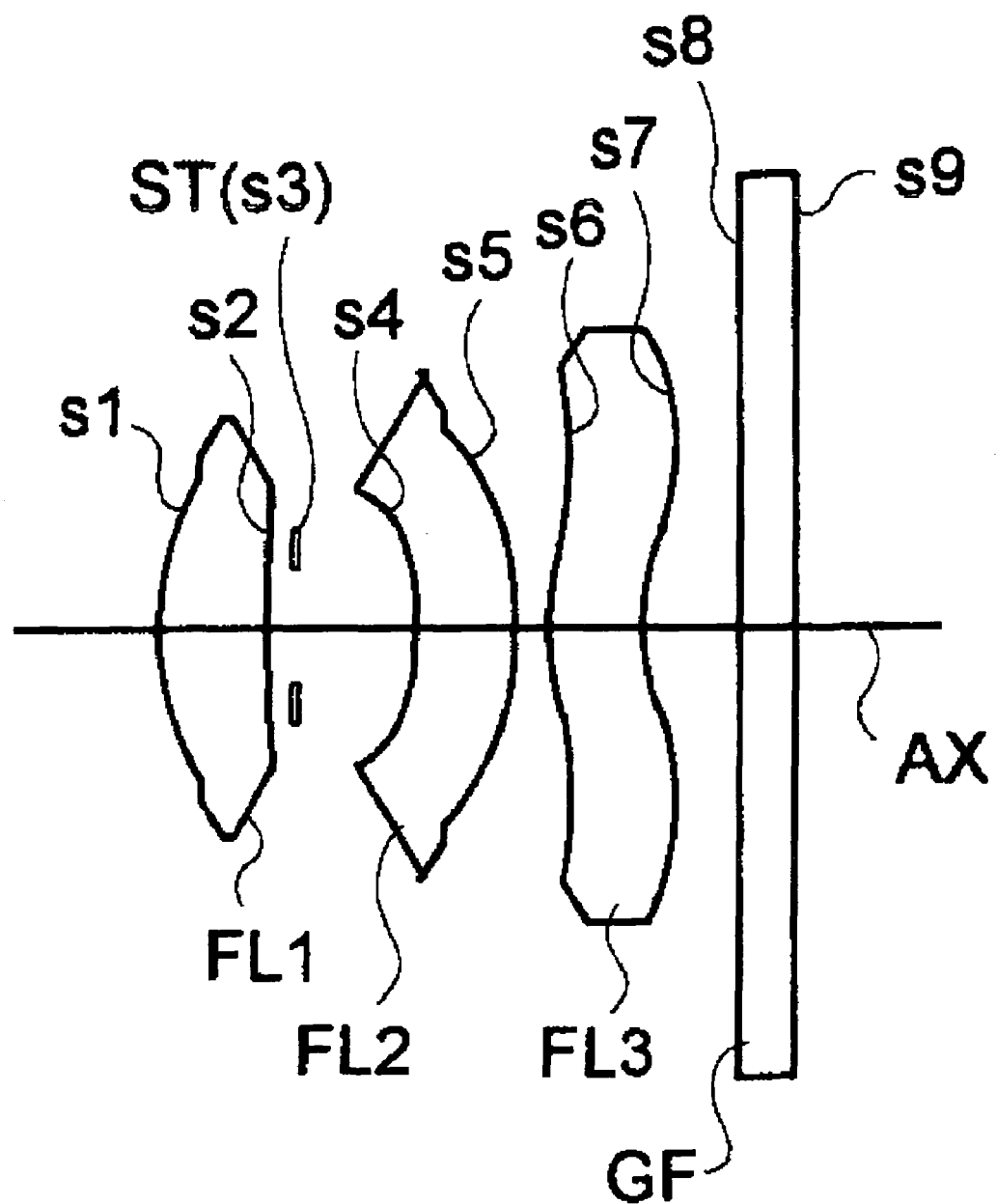
FIG. 4 shows a constitution of lenses according to a first example (Example 1) of the present invention.
Figure 5:
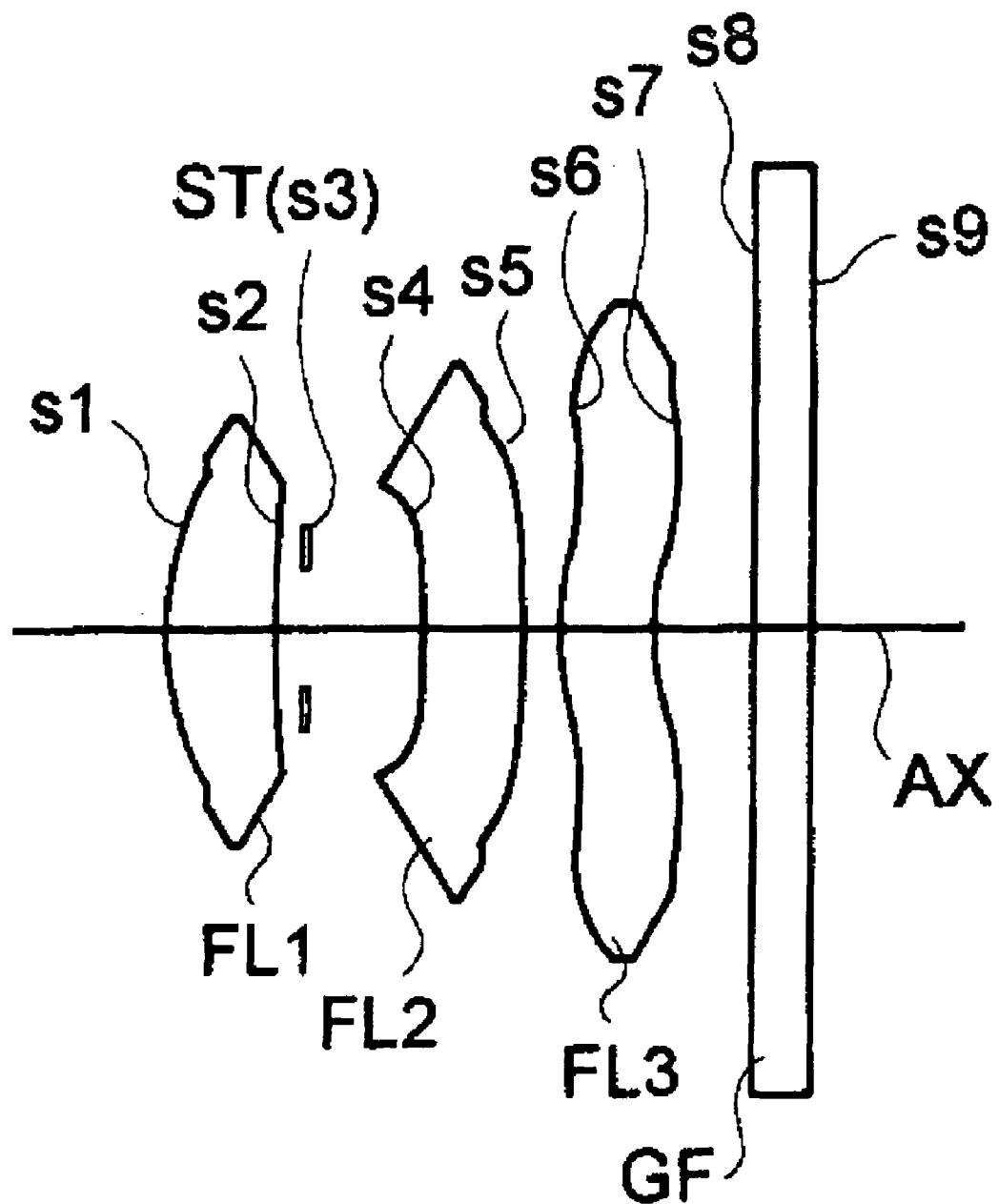
FIG. 5 shows a constitution of lenses according to a second example (Example 2) of the present invention.

FIGS. 4 and 5 respectively show sectional surfaces of the image pickup optical systems according to the first and second embodiments. The image pickup optical systems according to the respective embodiments each is an single focal point lens for image pickup (for example, used for digital camera), which forms an optical image with respect to the solid imaging element (for example, CCD), and respectively comprise three lenses, which are, from an object side, a positive first lens (FL1), an aperture stop (ST), a negative second lens (FL2) and a negative third lens (FL3). On an image side of the third lens (FL3), a glass filter (GF) having a shape of a parallel planar plate corresponding to an optical low pass filter or the like is disposed.

More specifically, the first lens (FL1) has a meniscus shape in which its convex surface is directed toward the object side constituting a lens having a positive power. The second lens (FL2) has a meniscus shape in which its concave surface is directed toward the object side constituting a lens having a negative power. The third lens (FL3) has a meniscus shape in which its concave surface is directed toward an image-surface side constituting a lens having a negative power.

Next, ranges of conditional expressions to be satisfied by the image pickup optical systems according to the respective embodiments are described. All of the following conditional expressions are not necessarily satisfied at the same time, and a corresponding operation/effect can be achieved when each of the conditional expressions is solely satisfied in accordance with an optical configuration. Of course, it is needless to say that the plurality of conditional expressions is desirably satisfied in terms of an optical performance, downsizing, assembling and the like.

In the first and second embodiments, the second lens (FL2) has the weak power, and the weak power desirably satisfies the following conditional expression (A0), and more desirably satisfies the following conditional expression (A01), $$-0.23 < f/f2 < -0.02 \quad (A0)$$

$$-0.23 < f/f2 < -0.11 \quad (A01)$$

provided that:
f: focal length of the entire system; and
f2: a focal length of the second lens (FL2).

The conditional expressions (A0) and (A01) mainly define a range of conditions for obtaining a balance between an entire length and an aberration of the optical system with respect to the second lens (FL2). When an upper limit of the conditional expression (A0) is surpassed, it works advantageously for correcting the aberration, however, increases the entire length of the optical system. On the contrary, when a lower limit of the conditional expression (A0) is surpassed, it works advantageously for the reduction of the entire length of the optical system, however, significantly deteriorates the aberration, in particular, a distortion aberration and an image surface curvature.

The third lens (FL3) desirably satisfies the following conditional expression (A1), and more desirably satisfies the conditional expression (A1) together with the aforementioned conditional expression (A0) or the conditional expression (A01), $$-0.09 < f/f3 < -0.01 \quad (A1)$$

provided that:
f: the focal length of the entire system; and
f3: a focal length of the third lens (FL3)

The conditional expression (A1) mainly defines a range of conditions for obtaining a balance between the entire length and the aberration of the optical system with respect to the third lens (FL3). When an upper limit of the conditional expression (A1) is surpassed, it works advantageously for correcting the aberration, however, increases the entire length of the optical system. On the contrary, when a lower limit of the conditional expression (A1) is surpassed, it works advantageously for the reduction of the entire length of the optical system, however, significantly deteriorates the aberration, in particular, the distortion aberration and the image surface curvature.

The second lens (FL2) desirably satisfies the following conditional expression (A2), and more desirably satisfies the conditional expression (A21). Further, it is even more desirable that the conditional expression (A2) be fulfilled together with at least one of the aforementioned conditional expressions (A0), (A01) and (A1), $$0.4 < |r4|/f < 5 \quad (A2)$$

$$0.5 < |r4|/f < 3 \quad (A21)$$

provided that:
r4: a curvature radius of the second lens on the object side
f: the focal length of the entire system.

The conditional expressions (A2) and (A21) mainly define a range of conditions for obtaining a balance between an exit-pupil position and the distortion aberration with respect to the second lens (FL2). When a lower limit of the conditional expression (A2) is surpassed, it works advantageously for the exit-pupil position, however, significantly deteriorates the distortion aberration. On the contrary, when an upper limit of the conditional expression (A2) is surpassed, it works advantageously for the distortion aberration, however, works disadvantageously for the exit-pupil position, which is unfavorable for the image pickup optical system used for the solid imaging element.

The first and second lenses (FL1 and FL2) desirably satisfy the following conditional expression (A3), and more desirably satisfy the following conditional expression (A31). Further, it is even more desirable that the conditional expression (A31) be fulfilled together with at least of the foregoing conditional expressions (A0), (A01), (A1), (A2) and (A21) is more desirably fulfilled, $$0.21 < ta/f < 0.51 \quad (A3)$$

$$0.21 < ta/f < 0.31 \quad (A31)$$

provided that:
ta: an axial distance from the image-surface side of the first lens to the surface of the second lens on the object side
f: the focal length of the entire system.

The conditional expressions (A3) and (A31) mainly define a range of conditions for obtaining a balance between the exit-pupil position and the distortion aberration in relation to the axial distance from the image-surface side of the first lens (FL1) to the surface of the second lens (FL2) on the object side. When an upper limit of the conditional expression (A3) is surpassed, it works advantageously for the exit-pupil position, however, significantly deteriorates the distortion aberration. On the contrary, when the upper limit of the conditional expression (A3) is surpassed, it works advantageously for the distortion aberration, however, works disadvantageously for the exit-pupil position, which is unfavorable for the image pickup optical system used for the solid imaging element.

Of all of the lenses of the image pickup optical system according to the present invention, at least one of them desirably has an aspherical surface. When at least one of the respective used lenses (FL1 through FL3) has the aspherical surface, a large effect is exerted on the correction of a spherical aberration, a coma aberration and the distortion aberration.

The image pickup optical systems according to the first and second embodiments respectively comprise only refractive lenses for deflecting an incident light through refraction (a type of lens in which the deflection is performed on an interface of media having different refractive indexes), however, the present invention is not limited thereto. For example, a diffractive lens for deflecting the incident light through diffraction, a refractive/diffractive hybrid lens for deflecting the incident light through the combination of the diffraction and refraction, a gradient index lens for deflecting the incident light through a refractive index distribution in the medium, and the like, may be alternatively used. However, when the gradient index lens in which the refractive index changes in the medium is used, the cost is increased by a complicated manufacturing method of the lens. Therefore, in the image pickup optical system according to the present invention, lenses of homogenous materials are desirably used as the first through third lenses (FL1 through FL3).

Further, the third lens (FL3) of the image pickup lenses according to the present invention desirably has the aspherical surface on the image-surface side thereof, has its negative power gradually weakened from the center of the lens toward the periphery thereof, and has the positive power at the peripheral part thereof. Such a constitution is effective in that the exit-pupil position is disposed distant while the entire length of the optical system is reduced.

Further, a luminous flux controlling plate for cutting off any unnecessary light, or the like, may by provided other than the aperture stop (ST) when necessary. A component of a prism type (for example, rectangular prism), a component of a mirror type (for example, planar mirror), or the like, may be provided in an optical path so that the optical path is bent at a position before or after the image pickup optical system or an intermediate position therein on the surface having no optical power (for example, reflection surface, refraction surface and diffraction surface) (for example, the luminous flux may be reflected in such manner that an optical axis (AX) is bent through 90 degrees). The bending position may be set as needed, and a digital apparatus, in which the image pickup optical system (digital camera or the like) is provided, can be reduced in thickness and size in appearance as a result of appropriately bending the optical path.

The image pickup optical systems according to the first and second embodiments are suitable for a small-size image pickup lenses system for the digital apparatus, and can constitute an image pickup device for optically fetching an image of a photographic subject and outputting the image as the electrical signal when the image pickup optical systems are combined with the optical low pass filter and the solid imaging element. The image pickup device is a main component in a camera for photographing a still image or a moving image of photographic subject (for example, camera incorporated in or externally mounted on, for example, the digital camera, video camera, digital video unit, personal computer, mobile computer, pen-shaped scanner, mobile telephone, mobile information terminal (PDA: Personal Digital Assistant), peripheral devices thereof (mouse, scanner, printer, and other digital input/output devices and the like). The image pickup device comprises, from the object (photographic subject) side, for example, the image pickup optical system for forming the optical image of the object, optical filters such as the optical low pass filter and infrared-ray cut filter, and solid imaging element for converting the optical image formed by the image pickup optical system into an electrical signal.

Therefore, the first and second embodiments include inventions 1)-4) constituted as below, and can provide an image pickup device having a favorable optical performance and reduced in cost and size according to the constitutions. The application of the image pickup optical systems to the digital camera and the like can contribute to a higher performance, a higher function and reductions in cost and size in the digital camera.

1) An image pickup device comprising an imaging element for converting an optical image of a photographic subject into an electrical signal and an image pickup optical system for forming the optical image of the photographic subject on a light receiving surface of the imaging element, wherein the image pickup optical system comprises three lenses, which are, from an object side, a positive first lens whose convex surface is directed toward the object side, an aperture stop, a negative second lens and a negative third lens, and at least one of the conditional expressions (A0), (A01), (A1), (A2), (A21), (A3) and (A31) is fulfilled.

2) The image pickup device recited in 1), wherein a negative lens whose concave surface is directed toward the object side constitutes the second lens, and a negative lens whose concave surface is directed toward an image-surface side constitutes the third lens.

3) The image pickup device recited in 1) or 2), wherein at least one of the first through third lenses has an aspherical surface.

4) An image pickup device which is a digital apparatus comprising an imaging element for converting an optical image of a photographic subject into an electrical signal, an image pickup optical system for forming the optical image on a light receiving surface of the imaging element, and a function unit for photographing at least one of a still image and a moving image of the photographic subject on an object side, wherein the image pickup optical system comprises three lenses, which are, from the object side, a positive first lens whose convex surface is directed toward the object side, an aperture stop, a negative second lens and a negative third lens, and at least one of the conditional expressions (A0), (A01), (A1), (A2), (A21), (A3) and (A31) is satisfied.

As examples of the digital apparatus can be mentioned a camera incorporated in or externally mounted on the digital camera, video camera, monitor camera, in-vehicle camera, view phone camera, door phone camera, personal computer, mobile computer, mobile telephone, mobile information terminal (PDA: Personal Digital Assistant), peripheral devices thereof (mouse, scanner, printer and the like) and other digital apparatuses. As known from the foregoing examples, the application of the image pickup device can not only constitute the respective cameras, but also additionally provide a camera function for the respective apparatuses when the image pickup device is installed therein. For example, a digital apparatus provided with an image input function, such as a camera-incorporated mobile phone, can be provided. Further, different modes according to need can be selectively adopted when the camera function is realized. For example, an image pickup device formed into a unit may be detachably or rotatably provided in a camera body, or the image pickup device formed into a unit may be detachably or rotatably provided in the mobile information device (mobile telephone, PDA or the like).

As the imaging element, a solid imaging element such as CCD or CMOS (Complementary Metal Oxide Semiconductor) sensor comprised of a plurality of pixels can be used. The optical image formed by the image pickup optical system is converted into the electrical signal by the solid imaging element. The optical image to be formed by the image pickup optical system, for example, transmits through the optical low pass filer having a predetermined cutoff frequency characteristic determined by a pixel pitch of the solid imaging element, and a space frequency characteristic is thereby adjusted so that a so-called aliasing noise generated when the optical image in converted into the electrical signal is minimized. The signal generated in the solid imaging element is subjected to a predetermined digital image processing or an image compression processing when necessary and recorded in a memory (semiconductor memory, optical disk or the like) as a digital image signal, or, in some cases, transmits through a cable or converted into an infrared-ray signal, and then, transmitted to other devices.

The optical low pass filter disposed between the final lens surface of the image pickup optical system and the solid imaging element is formed from a glass filter GF in the respective embodiments, however, there is no limitation as far as the filter can correspond to the used digital input device. For example, a birefringent low pass filter formed from crystal whose predetermined crystal axial direction is adjusted or the like, a phase low pass filter capable of achieving a required optical cutoff frequency characteristic through a diffraction effect or the like can be used.

Hereinafter, the image pickup optical system to which the present invention is implemented is described in more detail referring to construction data and the like. Examples 1 and 2 described below respectively correspond to the first and second embodiments described earlier, and the drawings of the lens constitutions (FIGS. 1 and 2), in which the first and second embodiments are shown, respectively show lens constitutions of the examples 1 and 2. In the construction data of the respective examples, ri (i=1, 2, 3 . . . ) denotes a curvature radius (mm) of an ith surface from the object side, di (i=1, 2, 3 . . . ) denotes an ith axial distance (mm) from the object side, and Σd denotes an entire length (mm) of the optical system. Ni (i=1, 2, 3 . . . ) and vi (i=1, 2, 3 . . . ) respectively denote a refractive index (Nd) and an Abbe number (vd) with respect to a d-line which is an ith optical element from the object side. A focal length (f, mm) of the entire system and an F number (FNO) are shown together with the other data, and corresponding values of the respective conditional expressions are shown in Table 1.

Further, a surface whose curvature radius ri is marked by * in each example denotes a refractive optical surface having the aspherical shape, and defined by the following conditional expression (AS) representing the aspherical surface shape. The data of the aspherical surface in the respective examples are shown together with the other data.

$$X(H)=(C \cdot H^2)/[1+\sqrt{(1-\epsilon \cdot C^2 \cdot H^2)}]+\Sigma(Ai \cdot H^i) \quad (AS)$$

To describe the foregoing expression (AS), X(H): a displacement amount (surface peak standard) in an optical-axis (AX) direction at a height position H, H: a vertical height relative to the optical axis (AX), C: paraxial curvature radius (=1/ curvature radius), $\epsilon$=quadric parameter, and Ai: aspherical coefficient of an ith order.

FIGS. 6 and 7 are aberration charts corresponding to the Examples 1 and 2. In the respective aberration charts, FIG. 6(A) and FIG. 7(A) are spherical aberration charts. FIG. 6(B) and FIG. 7(B) are astigmatism charts. FIG. 6(C) and FIG. 7(C) are distortion aberration charts. In the spherical aberration charts, a solid line (d) denotes a d-line, a dashed line (g) denotes a g-line, a chain double-dashed line (c) denotes a spherical aberration amount (mm) relative to a c-line, and a broken line (SC) denotes a sine unsatisfactory amount (mm). Further, a longitudinal axis in the spherical aberration charts (A) denotes an F number (FNO), and a longitudinal axis in the astigmatism charts (B) and a longitudinal axis in the distortion aberration charts (C) denote an image maximum height Y' (mm). In the astigmatism charts, a broken line (DM)

denotes an astigmatism relative to the d-line on a meridional plane, while a solid line (DS) denotes an astigmatism relative to the d-line on a sagittal plane. In the distortion aberration charts, a solid line denotes a distortion (%) relative to the d-line.

EXAMPLE 1

| $f = 5.470$, FNO = 4.0 | | | |
|---|---|---|---|
| radius of curvature | axial distance | refractive index | Abbe number |
| s1 r1* = 2.611 | d1 = 1.021 | N1 = 1.67000 | ν1 = 57.07(FL1) |
| s2 r2* = 8.247 | d2 = 0.261 | N2 = 1.53048 | ν2 = 55.72(FL2) |
| s3 r3 = ∞(ST) | d3 = 1.110 | N3 = 1.58340 | ν3 = 30.23(FL3) |
| s4 r4* = −3.470 | d4 = 0.913 | N4 = 1.51680 | ν4 = 64.20(GF) |
| s5 r5* = −4.569 | d5 = 0.307 | | |
| s6 r6* = 2.124 | d6 = 0.877 | | |
| s7 r7* = 1.708 | d7 = 0.900 | | |
| s8 r8 = ∞ | d8 = 0.500 | | |
| s9 r9 = ∞ | Σd = 5.889 | | |

[aspheric surface data of 1st surface (r1)]
$\epsilon = 0.24691$
A2=0.0, A3=0.0, A4=−0.17737×10$^{-2}$, A5=0.0, A6=0.12774×10$^{-2}$, A7=0.0, A8=−0.28811×10$^{-3}$, A9=0.0, A10=−0.28254×10$^{-3}$, A11=0.0, A12=0.0, A13=0.0, A14=0.0, A15=0.0, A16=0.0

[aspheric surface data of 2nd surface (r2)]
$\epsilon = -12.575$
A2=0.0, A3=0.0, A4=−0.95444×10$^{-2}$, A5=0.0, A6=0.92656×10$^{-3}$, A7=0.0, A8=0.55284×10$^{-2}$, A9=0.0, A10=−0.84266×10$^{-2}$, A11=0.0, A12=0.0, A13=0.0, A14=0.0, A15=0.0, A16=0.0

[aspheric surface data of 4th surface (r4)]
$\epsilon = 0.0$
A2=0.0, A3=0.0, A4=0.21610×10$^{-1}$, A5=0.0, A6=−0.53855×10$^{-1}$, A7=0.0, A8=0.50367×10$^{-2}$, A9=0.0, A10=−0.67374×10$^{-2}$, A11=0.0, A12=0.0, A13=0.0, A14=0.0, A15=0.0, A16=0.0

[aspheric surface data of 5th surface (r5)]
$\epsilon = 1.3654$
A2=0.0, A3=0.0, A4=−0.57722×10$^{-2}$, A5=0.0, A6=−0.27146×10$^{-2}$, A7=0.0, A8=−0.21044×10$^{-2}$, A9=0.0, A10=0.53508×10$^{-3}$, A11=0.0, A12=0.0, A13=0.0, A14=0.0, A15=0.0, A16=0.0

[aspheric surface data of 6th surface (r6)]
$\epsilon = -2.9971$
A2=0.0, A3=0.0, A4=−0.65084×10$^{-1}$, A5=0.0, A6=0.12068×10$^{-1}$, A7=0.0, A8=−0.92597×10$^{-3}$, A9=0.0, A10=0.26686×10$^{-4}$, A11=0.0, A12=0.0, A13=0.0, A14=0.0, A15=0.0, A16=0.0

[aspheric surface data of 7th surface (r7)]
$\epsilon = -3.5789$
A2=0.0, A3=0.0, A4=−0.39513×10$^{-1}$, A5=0.0, A6=0.49581×10$^{-2}$, A7=0.0, A8=−0.34675×10$^{-3}$, A9=0.0, A10=0.11619×10$^{-4}$, A11=0.0, A12=0.0, A13=0.0, A14=0.0, A15=0.0, A16=0.0

EXAMPLE 2

| $f = 5.472$, FNO = 4.0 | | | |
|---|---|---|---|
| radius of curvature | axial distance | refractive index | Abbe number |
| s1 r1* = 2.632 | d1 = 1.008 | N1 = 1.67000 | ν1 = 57.07(FL1) |
| s2 r2* = 8.093 | d2 = 0.261 | N2 = 1.53048 | ν2 = 55.72(FL2) |
| s3 r3 = ∞(ST) | d3 = 1.062 | N3 = 1.58340 | ν3 = 30.23(FL3) |
| s4 r4* = −12.461 | d4 = 0.875 | N4 = 1.51680 | ν4 = 64.20(GF) |
| s5 r5* = −218.181 | d5 = 0.349 | | |
| s6 r6* = 2.353 | d6 = 0.858 | | |
| s7 r7* = 1.986 | d7 = 0.900 | | |
| s8 r8 = ∞ | d8 = 0.500 | | |
| s9 r9 = ∞ | Σd = 5.813 | | |

[aspheric surface data of 1st surface (r1)]
$\epsilon = 0.10945$
A2=0.0, A3=0.0, A4=−0.26963×10$^{-2}$, A5=0.0, A6=0.10004×10$^{-2}$, A7=0.0, A8=−0.27325×10$^{-3}$, A9=0.0, A10=−0.39829×10$^{-3}$, A11=0.0, A12=0.0, A13=0.0, A14=0.0, A15=0.0, A16=0.0

[aspheric surface data of 2nd surface (r2)]
$\epsilon = -14.000$
A2=0.0, A3=0.0, A4=−0.10487×10$^{-1}$, A5=0.0, A6=−0.83800×10$^{-3}$, A7=0.0, A8=0.37339×10$^{-2}$, A9=0.0, A10=−0.58468×10$^{-2}$, A11=0.0, A12=0.0, A13=0.0, A14=0.0, A15=0.0, A16=0.0

[aspheric surface data of 4th surface (r4)]
A2=0.0, A3=0.0, A4=0.14339×10$^{-1}$, A5=0.0, A6=0.47853×10$^{-1}$, A7=0.0, A8=0.82075×10$^{-2}$, A9=0.0, A10=−0.56518×10$^{-2}$, A11=0.0, A12=0.0, A13=0.0, A14=0.0, A15=0.0, A16=0.0

[aspheric surface data of 5th surface (r5)]
$\epsilon = 2.0000$
A2=0.0, A3=0.0, A4=−0.84320×10$^{-2}$, A5=0.0, A6=−0.23652×10$^{-2}$, A7=0.0, A8=−0.19193×10$^{-2}$, A9=0.0, A10=0.43603×10$^{-3}$, A11=0.0, A12=0.0, A13=0.0, A14=0.0, A15=0.0, A16=0.0

[aspheric surface data of 6th surface (r6)]
$\epsilon = -4.0000$
A2=0.0, A3=0.0, A4=−0.63281×10$^{-1}$, A5=0.0, A6=0.12289×10$^{-1}$, A7=0.0, A8=−0.89927×10$^{-3}$, A9=0.0, A10=0.24895×10$^{-4}$, A11=0.0, A12=0.0, A13=0.0, A14=0.0, A15=0.0, A16=0.0

[aspheric surface data of 7th surface (r7)]
$\epsilon = -4.7955$
A2=0.0, A3=0.0, A4=−0.39159×10$^{-1}$, A5=0.0, A6=0.49158×10$^{-2}$, A7=0.0, A8=−0.31112×10$^{-3}$, A9=0.0, A10=0.13192×10$^{-4}$, A11=0.0, A12=0.0, A13=0.0, A14=0.0, A15=0.0, A16=0.0

TABLE 1

| | Conditional expression (A0) f/f2 | Conditional expression (A1) f/f3 | Conditional expression (A2) \|r4\|/f | Conditional expression (A3) ta/f |
|---|---|---|---|---|
| Example 1 | −0.14 | −0.08 | 0.63 | 0.25 |
| Example 2 | −0.22 | −0.03 | 2.27 | 0.24 |

In the foregoing examples, a refractive optical surface is used as each of all of optical function surfaces, however, a surface other than the refractive optical surface (for example, reflection surface or diffraction surface) may be used.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image pickup optical system for forming an image on a solid image element, consisting of from an object side:
    a first lens having a positive power whose convex surface is directed toward the object side;
    an aperture stop;
    a second lens having a negative power; and
    a third lens having a negative power,
    wherein the following conditional expression is fulfilled, $-0.23 < f/f2 < -0.02$ where
    f: a focal length of the entire system; and
    f2: a focal length of the second lens.

2. An image pickup optical system according to claim 1, wherein the following condition is fulfilled, $-0.09 < f/f3 < -0.01$ where
    f3: a focal length of the third lens.

3. An image pickup optical system according to claim 1, wherein the following condition is fulfilled, $0.4 < |r4|/f < 5$ where
    r4: a curvature radius of the object side surface of the second lens.

4. An image pickup optical system according to claim 1, wherein the following condition is fulfilled, $0.21 < ta/f < 0.51$ where
    ta: an axial distance from the image side surface of the first lens to the object side surface of the second lens.

5. An image pickup optical system according to claim 1, wherein a concave surface of the second lens is directed toward the object side.

6. An image pickup optical system according to claim 1, wherein a concave surface of the third lens is directed toward the image side.

7. An image pickup optical system according to claim 1, wherein at least one lens includes an aspherical surface.

8. An imaging apparatus comprising:
    imaging elements for converting an optical image to an electrical signal; and
    an image pickup optical system that forms an optical image of the object on a receiving surface of said imaging elements,
    wherein said image pickup optical system consists of from an object side:
    a first lens having a positive power whose convex surface is directed toward the object side;
    an aperture stop;
    a second lens having a negative power; and
    a third lens having a negative power,
    and wherein the following conditional expression is fulfilled, $-0.23 < f/f2 < -0.02$ where
    f: a focal length of the entire system; and
    f2: a focal length of the second lens.

9. A digital apparatus comprising an imaging unit which includes imaging elements for converting an optical image to an electrical signal, and an image pickup optical system that forms an optical image of the object on a receiving surface of said imaging elements,
    wherein said image pickup optical system consists of from an object side:
    a first lens having a positive power whose convex surface is directed toward the object side;
    an aperture stop;
    a second lens having a negative power; and
    a third lens having a negative power,
    and wherein the following conditional expression is fulfilled, $-0.23 < f/f2 < -0.02$ where
    f: a focal length of the entire system; and
    f2: a focal length of the second lens.

* * * * *